United States Patent [19]

van Husen

[11] Patent Number: 4,631,655

[45] Date of Patent: Dec. 23, 1986

[54] POWER DISTRIBUTION SYSTEM

[75] Inventor: Hendrik van Husen, Glen Ellyn, Ill.

[73] Assignee: GTE Communication Systems Corp., Northlake, Ill.

[21] Appl. No.: 685,655

[22] Filed: Dec. 24, 1984

[51] Int. Cl.[4] .............................................. H02H 7/10
[52] U.S. Cl. ........................................ 363/50; 363/65
[58] Field of Search ....................... 363/50, 52, 53, 55, 363/56, 65

[56] References Cited

U.S. PATENT DOCUMENTS

| 3,040,309 | 6/1962 | Miller | 363/52 |
| 4,031,452 | 6/1977 | Longa et al. | 363/52 |
| 4,063,302 | 12/1977 | Donig et al. | 363/56 |
| 4,150,425 | 4/1979 | Nagano et al. | 363/56 |
| 4,272,816 | 6/1981 | Matsumoto | 363/50 |
| 4,394,619 | 7/1983 | Gschwandtner | 323/368 |

FOREIGN PATENT DOCUMENTS 58-43176 3/1983 Japan ...................................... 363/50

Primary Examiner—Peter S. Wong
Assistant Examiner—Judson H. Jones
Attorney, Agent, or Firm—Gregory G. Hendricks

[57] ABSTRACT

A power distribution system that provides supervision and protection. Hall effect devices are used to monitor power from a central power supply to a plurality of power converters. Fuses are connected between the converters and the central power source to protect the converters from catastrophic failure. Hall effect devices also monitor the output of power from the converters. A current controlling inductor is included between the converter outputs and the output power bus in order to restrict reverse current flow from a time that is sufficient to allow a circuit breaker to disconnect a failed converter. The Hall effect devices are connected to a computer which monitors the power in and out of the converters. The computer is thus able to detect a failed converter and disconnects it by operating an associated circuit breaker.

23 Claims, 1 Drawing Figure

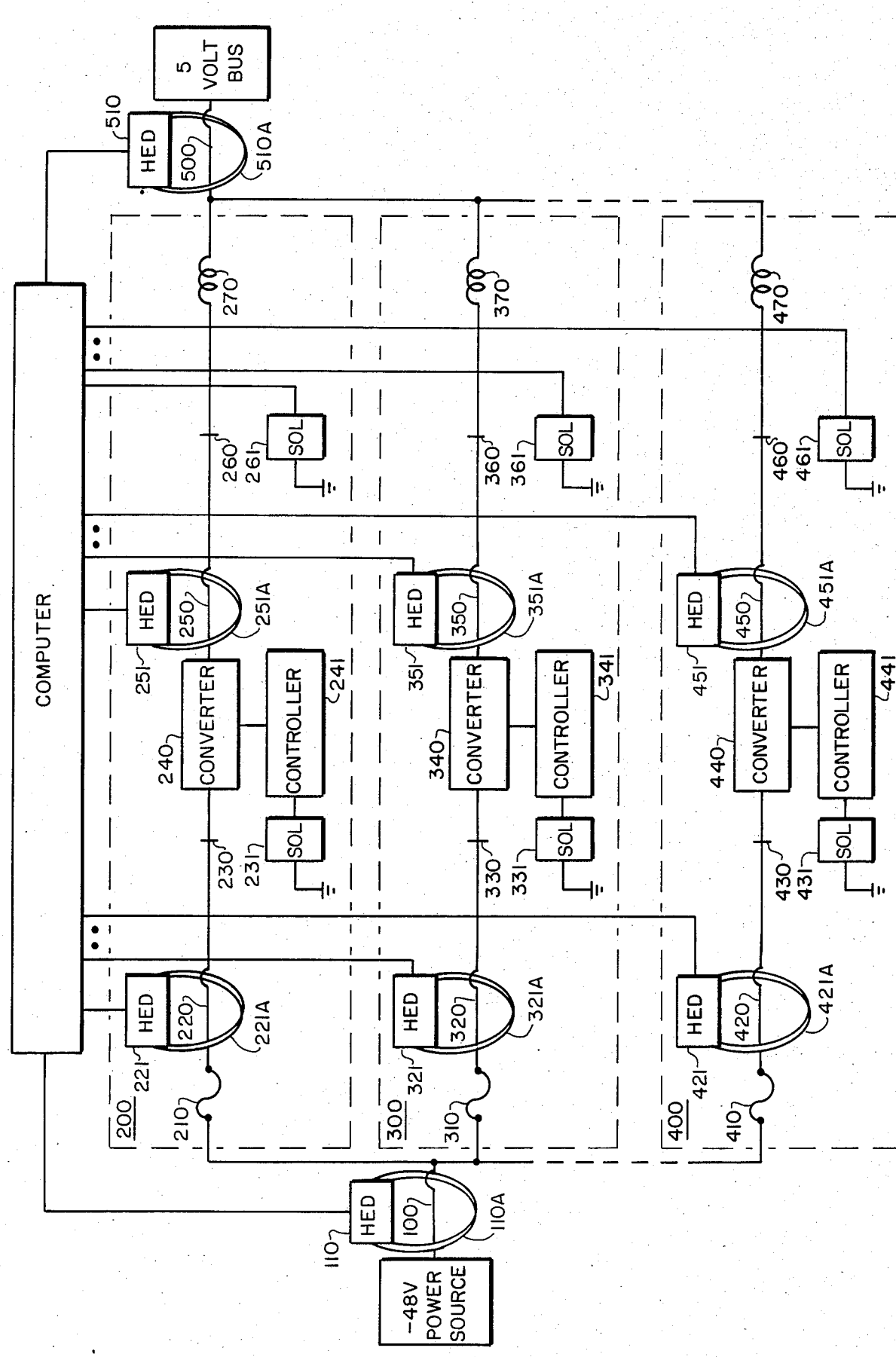

4,631,655

POWER DISTRIBUTION SYSTEM

FIELD OF THE INVENTION

The present invention relates to power distribution systems and more particularly to a power distribution system for use in an electronic system.

BACKGROUND OF THE INVENTION

Power distribution systems are old and well-known. Typically they include a plurality of converters that are connected to the central power supply. Associated with each converter is a circuit breaker which is operated when the associated converter fails. A signal indicating such failure is often sent to a computer which then provides a signal or printout to inform an attendant of the converter failure.

Such systems, however, are limited to disconnection of failed converters. They do not provide for constant monitoring of the efficiency of the converters in order to detect a malfunctioning converter before it fails. Also, prior art systems do not protect malfunctioning converters from catastrophic failure since such systems do not restrict reverse current from other converters for the time required to disconnect a malfunctioning converter.

SUMMARY OF THE INVENTION

In accordance with the present invention, a power distribution system is provided for use in an electronic system that includes a load bus, a load connected to the load bus, and a direct current power source which is operative to provide power of a first characteristic. The power distribution system includes an input power monitoring circuit that is connected to the power source and a plurality of power conversion circuits that are connected to the input powe montoring circuit.

The input power monitoring circuits are operative to monitor current flow from the power source to the power conversion circuits, and to provide a plurality of power input status signals, each associated with a different one of the power conversion circuits. Each of the power conversion circuits are operative to convert the power supplied by the power source to power of a different characteristic.

The power distribution system also includes an output power monitor and control circuit that is connected between the plurality of power conversion circuits and the load bus, and this circuit is operative both to monitor current flow from the power conversion circuits and to provide a plurality of power output status signals, each associated with a different one of the power conversion circuits.

A power comparison circuit is also included and it is connected to the input power monitoring circuit and the output power monitor and control circuit. This comparison circuit is operative to compare the power input and output status signals to predetermined values therefor, and to provide a failure signal for each status signal that does not correspond to its predetermined values.

DESCRIPTION OF THE DRAWING

The single FIGURE of the accompanying drawing is a combined schematic and block diagram of the power distribution system of the present invention.

DESCRIPTION OF THE PREFERRED EMBODIMENT

Referring now to the accompanying drawing the power distribution system of the present invention is shown connected to a −48 volt power source, a +5 volt bus and a computer. Conductor 100 is connected to the −48 volt power source and the assembly of Hall effect device 110 and flux concentrator 110A is located in magnetic field proximity thereto. Hall effect device 110 is also connected to the computer. A plurality of power conversion and monitoring circuits are connected to conductor 100. Three such circuits 200, 300 and 400 are shown connected. However, the present invention is not limited to only three power conversion and monitoring circuits. The present invention will be described with reference to power conversion and monitoring circuit 200 since the other power conversion and monitoring circuits are identical.

Power conversion and monitoring circuit 200 includes fuse 210 which is connected between conductor 100 and conductor 220. The asembly of Hall effect device 221 and flux concentrator 221A is located in magnetic field proximity to conductor 220 and Hall effect device 221 is electrically connected to the computer. Conductor 220 is further connected to contact 230 which is magnetically coupled to solenoid 231. Converter 240 is connected to contact 230, conductor 250, and controller 241 which is also connected to solenoid 231. The assembly of Hall effect device 251 and flux concentrator 251A is located in magnetic field proximity to conductor 250 and Hall effect device 251 is also electrically connected to the computer. Contact 260 is connected to conductor 250 and it is magnetically coupled to solenoid 261 which is connected to the computer. Inductor 270 is connected between contact 260 and conductor 500 which is further connected to the +5 volt bus. The assembly of Hall effect device 510 and flux concentrator 510A is located in magnetic field proximity to conductor 500 and this Hall effect device 510 is also electrically connected to the computer.

When converter 240 is operating properly current flows from the −48 volt power source, through conductor 100, fuse 210, conductor 220, contact 230 and into converter 240. This converter then provides a +5 volt output potential and causes a resultant current to flow through conductor 250, contact 260, inductor 270, conductor 500 and the +5 volt bus, if a load is connected to that bus. Conductor 100 generates a magnetic flux in response to current flow through it. Hall effect device 110 indirectly monitors this current flow since it monitors the magnetic flux generated by inductor 110 and concentrated by concentrator 110A. Hall effect device 110 then provides a signal to the computer representative of the current flowing out of the −48 volt power source.

Fuse 210 is effective to prevent catastrophic failure to converter 240 since it opens the path of current flow through this converter when the current reaches an excessive leel for a predetermined period of time.

Conductor 220 generates a magnetic flux in response to current flowing through it and converter 240. Hall effect device 221 monitors the magnetic flux generated by conductor 220 and therefore it indirectly monitors the current flowing into converter 240. Hall effect device 221 then provides a signal to the computer representing the current flowing through converter 24. Thus, the computer is able to monitor, via Hall effect device 110, the total current flowing into the power distribution system and it is also above to monitor, via Hall effect device 221, the current flowing into converter 240.

Converter 240 operates to convert the −48 volt potential occuring at its input to one or more different voltages at its output. Typically, these converters provide a +5 volt, +12 volt, or both potentials at their output. In the present application converters 240, 340 and 440 provide a +5 volt potential which is applied to the +5 volt bus. Controller 241 monitors the operation of converter 240 and upon detection of a malfunction in this converter, it operates solenoid 231. When this solenoid operates, it opens contact 230, thereby disconnecting converter 240 from the −48 volt power source. When converter 240 is operating properly, the +5 volt potential, appearing at the output of converter 240, is applied to the +5 volt bus via conductors 250 and 500, inductor 270 and contact 260.

If a load is attached to the bus then a resultant current flows through conductor 250 which then generates a magnetic flux. Hall effect device 251 monitors this magnetic flux and provides a signal representative thereof to the computer. Thus, the computer is provided with an indication of the current flowing into the converter, via Hall effect device 221, and the current flowing out of the converter, via Hall effect device 251. The computer is therefore able to determine the efficiency of the converter by comparing these input and output signals to each other and to predetermined values therefor. Since a predetermined efficiency is expected for converter 240, any variation therefrom can be determined by the computer. In the event that the efficiency is below a minimum acceptable level, the computer operates solenoid 261 which causes contact 260 to open, thereby disconnecting converter 240 from the +5 volt bus.

Inductor 270 is a current controlling inductor. In the event that converter 240 should fail, inductor 270 restricts the current flow from other converters into this failed converter. Such inflow of current is restricted to the magnetizing level of current for inductor 270. When converter 204 fails, current through inductor 270 must first decrease to zero and then reverse direction and flow into converter 240. The time required for this reverse current flow to build up to the magnetizing level of inductor 270, is greater than the time required for computer 270 to detect the failure in converter 240 and operate solenoid 261. Therefore, converter 240 is protected from damage due to excessive reverse current since it is disconnected from the +5 volt bus, via contact 260, before reverse current can exceed the magnetizing level of inductor 270. Converter 240 thus is also prevented from pulling down the voltage on the +5 volt bus.

Conductor 500 is connected to the junction of inductors 270, 370 and 470 and it thus creates a magnetic flux in response to current flowing from converters 240, 340 and 440. Hall effect device 510 monitors the magnetic flux generated by conductor 500 and provides a signal to the computer with represents the total current generated by converters 240, 340 and 440. Therefore, the computer is provided with an indication of the total current flowing out of converters 240, 340 and 440. By comparing this output current with the current input as indicated by the signal from Hall effect device 110, the computer is able to determine the overall efficiency of converters 240, 340 and 440. The resultant efficiency can be compared with a predetermined expected efficiency and computer printouts or other signalling means can be used to provide an indication of the actual versus the expected efficiency of these converters.

Thus, each converter has its input and output power measured on a continuous basis, by Hall effect devices. The output of the Hall effect devices is a voltage that is proportional to the monitored power. The signals provided by the Hall effect devices are applied to the computer. The computer could include a comparator for each Hall effect device. This comparator would be set to the voltage equivalent of the maximum power that is permitted in a given circuit. If that power is exceeded, the comparator provides a corresponding signal and the computer takes corrective action, such as operating fast acting solenoid 260.

The signals from the Hall effect devices could also be applied directly to a computer controlled supervisory system. This computer system would frequently check the Hall effect device signals to verify that the converters share the load properly. Deviations from predetermined expected ratios would again result in corrective action being taken, such as operating fast acting solenoid 260 or providing a computer printout for maintenance personnel.

The present invention also provides for fail safe operation since, if a single Hall effect device does not operate properly, this condition will be detected by the computer by means of cross checks with corresponding Hall effect devices.

Thus, the power distribution system of the present invention provides a novel, highly reliable and fail safe means of distributing power from a power source to a load bus. Hall effect devices are used to monitor current flowing from the power source, into and out of the various power converters, and into the load bus. Each of the Hall effect devices provides a signal representative of its respective detected current flow. These signals are applied to a computer which monitors these signals and compares them to predetermined expected values. Fuses are used to prevent catastrophic failure due to prolonged high current conditions. Logic controlled relays are used to disconnect a failed converter from the power source, and fast acting computer controlled relays are used by the computer to disconnect a malfunctioning converter from the load bus. Current controlling inductors are used to delay current build up in the converters for the time period required for the fast acting relays to operate and thereby disconnecting the converters from the load bus.

It will be obvious to those skilled in the art that numerous modifications of the present invention can be made without departing from the spirit of the invention which shall be limited only by the scope of the claims appended hereto.

What is claimed is:

1. A power distribution system for use in an electronic system that includes a load bus, a load connected to said load bus, and a direct current power source which is operative to provide power of a first characteristic, said power distribution system comprising:
   an input power monitoring circuit connected to said power source;
   a plurality of power conversion circuits that are connected to said input power monitoring circuit;
   said input power monitoring circuit being operative to monitor current flow from said power source to said power conversion circuit and to provide a plurality of power input status signals, each associated with a different one of said power conversion circuits;

each of said power conversion circuits being operative to convert said power of a first characteristic to power of a different characteristic;

an output power monitor and control circuit that is connected between said plurality of power conversion circuits and said load bus, and is operative both to monitor current flow from said power conversion circuits and to provide a plurality of power output status signals, each associated whit a different one of said power conversion circuits; and a power comparison circuit that is connected to said plurality of power conversion circuits and is operative both to compare said power input and output status signals to predetermined values therefor, and to provide a failure signal for each status signal that does not correspond to its predetermined value;

said output power monitor and control circuit comprising a plurality of current controlling inductors, each being connected between said load bus and an associated one of said power conversion circuits, each of said current controlling inductors being effective to restrict current flow from said load bus into said associated power conversion circuit to a predetermined level and for a predetermined time which is greater than the time required for said output power monitor and control circuit to disconnect said associated power conversion circuit from said load bus.

2. A power distribution system as claimed in claim 1, wherein said input power monitoring circuit comprises:
a first magnetic flux device that is operative to generate a magnetic flux in response to current flowing from said power source; and
a first Hall effect device that is connected in magnetic field proximity to said first magnetic flux device and is operative in response to said magnetic flux to indirectly monitor said current from said power source.

3. A power distribution system as claimed in claim 1, wherein said input power monitoring circuit comprises:
a plurality of magnetic flux devices, each of which is connected to an associated one of said power conversion circuits, each magnetic flux device being operative to generate a magnetic flux in response to current flowing from said power source into said associated power conversion circuit; and
a plurality of Hall effect devices, each being connected in magnetic field proximity to one of said magnetic flux devices, and each being operative in response to said magnetic flux to indirectly monitor said current from said power source into said associated power conversion circuit.

4. A power distribution system as claimed in claim 2, wherein said input power monitoring circuit further comprises:
a plurality of second magnetic flux devices, each of which is connected between said first Hall effect device and an associated one of said power conversion circuits, each second magnetic flux device being operative to generate a magnetic flux in response to current flowing from said power source into said associated power conversion circuit; and
a plurality of second Hall effect devices, each being connected in magnetic field proximity to one of said magnetic flux device, and each being operative in response to said magnetic flux to indirectly monitor said current from said power source into said associated power conversion circuit.

5. A power distribution system as claimed in claim 1, wherein said input power monitoring circuit comprises:
a plurality of fuses, each of which is connected to an associated one of said power conversion circuits, each fuse being operative to disconnect said associated power conversion circuit from said power source when a predetermined level and duration of current flows through said fuse.

6. A power distribution system as claimed in claim 4, wherein said power distribution system comprises:
a plurality of fuses, each of which is connected between said first magnetic flux device and an associated one of said second magnetic flux devices, each fuse being operative to disconnect said associated power conversion circuit from said power source when a predetermined level and duration of current flows through the fuse.

7. A power distribution system as claimed in claim 1, wherein each of said power conversion circuits comprises:
a voltage converter.

8. A power distribution system as claimed in claim 7, wherein each of said power conversion circuits further comprises:
a controller circuit that is connected to said voltage converter;
said voltage converter being operative to provide a converter malfunction signal;
each of said controller circuits being operative in response to said converter malfunction signal to provide a solenoid control signal;
a solenoid that is connected to said controller circuit; and
a solenoid controlled contact that is connected between said voltage converter and said power source;
said solenoid being operative in response to said solenoid control signal to cause said contact to open, whereby said voltage converter is disconnected from said power source.

9. A power distribution system as claimed in claim 4, wherein each of said power conversion circuits comprises:
a voltage converter;
a controller circuit that is connected to said voltage converter;
said voltage converter being operative to provide a converter malfunction signal;
each of said controller circuits being operative in response to said converter malfunction signal to provide a solenoid control signal;
a solenoid that is connected to said controller circuit; and
a solenoid controlled contact that is connected between said voltage converter and said second magnetic flux device associated with said power conversion circuit;
said solenoid being operative in response to said solenoid control signal to cause said contact to open, whereby said voltage converter is disconnected from said second magnetic flux device associated with said power conversion circuit.

10. A power distribution system as claimed in claim 1, wherein said output power monitor and control circuit is further operative in response to said failure signals to disconnect the associated power conversion circuit from said load bus.

11. A power distribution system as claimed in claim 10, wherein said output power monitor and control circuit comprises:
- a plurality of first magnetic flux devices, each of which is connected to an associated one of said power conversion circuits, each first magnetic flux device being operative to generate a magnetic flux in response to current flowing out of said associated power conversion circuit; and
- a plurality of first Hall effect devices, each being connected in magnetic field proximity to an associated one of said first magnetic flux devices, and each being operative in response to said magnetic flux to indirectly monitor current flowing out of said associated power conversion circuit.

12. A power distribution system as claimed in claim 10, wherein said output power monitor and control circuit comprises:
- a plurality of solenoids each of which is connected to said power comparison circuit; and
- a plurality of contacts each being connected between said load bus and an associated one of said power conversion circuits, and each being coupled to an associated one of said solenoids;
- each solenoid being operative in response to an associated one of said failure signals to cause said associated contact to disconnect said associated power conversion circuit from said load bus.

13. A power distribution system as claimed in claim 10, wherein said output power monitor and control circuit comprises;
- a magnetic flux device that is connected between said load bus and said plurality of power conversion circuits, and is operative to generate a magnetic flux in response to current flowing into said load bus; and
- a Hall effect device that is connected in magnetic field proximity to said magnetic flux device and is operative in response to said magnetic flux to indirectly monitor said current flowing into said load bus.

14. A power distribution system as claimed in claim 11, wherein said output power monitor and control circuit comprises:
- a plurality of solenoids, each of which is connected to said power comparison circuit; and
- a plurality of circuit breakers, each being connected between said load bus and an associated one of said first magnetic flux devices, and each being coupled to an associated one of said solenoids;
- each solenoid being operative in response to an associated one of said failure signals to cause said associated circuit breaker to disconnect said associated first magnetic flux device from said load bus.

15. A power distribution system as claimed in claim 14, wherein said output power monitor and control circuit further comprises:
- a plurality of current controlling inductors, each being connected between said load bus and an associated one of said circuit breakers, said current controlling inductors being effective to restrict current flow, from said load bus into said associated power conversion circuit, to a predetermined level and for a predetermined time which is greater than the time required for said associated solenoid controlled circuit breaker to disconnect the associated first magnetic flux device from said load bus.

16. A power distribution system as claimed in claim 15, wherein said output power monitor and control circuit comprises:
- a second magnetic flux device that is connected between said load bus and said plurality of current controlling inductors, and is operative to generate a magnetic flux in response to current flowing into said load bus; and
- a second Hall effect device that is connected in magnetic field proximity to said second Hall effect device and is operative in response to said magnetic flux to indirectly monitor said current flowing into said load bus.

17. A power distribution system as claimed in claim 1, wherein said power comparison circuit comprises a computer.

18. A power distribution system as claimed in claim 2, wherein said magnetic flux device comprises a conductor and a flux concentrator.

19. A power distribution system as claimed in claim 3, wherein each of said magnetic flux devices comprises a conductor and a flux concentrator.

20. A power distribution system as claimed in claim 4, wherein each of said second magnetic flux devices comprises a conductor and a flux concentrator.

21. A power distribution system as claimed in claim 11, wherein each of said first magnetic flux devices comprises a conductor and a flux concentrator.

22. A power distribution system as claimed in claim 13, wherein said magnetic flux device comprises a conductor and a flux concentrator.

23. A power distribution system as claimed in claim 16, wherein said magnetic flux device comprises a conductor and a flux concentrator.

* * * * *